United States Patent [19]

Harmer

[11] 4,315,147
[45] Feb. 9, 1982

[54] PHOTOELECTRIC SWITCH WITH VISIBLE SIGNAL

[75] Inventor: Alan L. Harmer, Bernex, Switzerland

[73] Assignee: Battelle Memorial Institute, Carouge, Switzerland

[21] Appl. No.: 121,700

[22] Filed: Feb. 15, 1980

[51] Int. Cl.³ ............................................ G02B 5/14
[52] U.S. Cl. .................................. 250/227; 250/229
[58] Field of Search ............... 250/221, 222, 227, 229, 250/239; 340/365 P, 782, 380; 350/96.15, 96.16

[56] References Cited

U.S. PATENT DOCUMENTS 3,544,749 12/1970 De Angelo ........................ 250/227
3,787,837 1/1974 Allen et al. ...................... 340/365 P
4,152,699 5/1979 Sachsse ............................ 250/221

Primary Examiner—David C. Nelms
Attorney, Agent, or Firm—Karl F. Ross

[57] ABSTRACT

A two-position switch for the control of a load, e.g. of a channel selector of a television receiver, comprises a transparent or translucent pushbutton with a stem carrying an optical reflector, such as a prism with a metallized surface, in an opaque housing receiving proximal ends of two optical fibers or fiber bundles whose distal ends confront a light source and a photodetector, respectively. In one position, the reflector directs light from the source to an exposed face of the pushbutton as a signal visible to the user while cutting off the illumination of the photodetector; in the other position, the visible light signal disappears while the photodetector is irradiated to operate the load.

7 Claims, 7 Drawing Figures

PHOTOELECTRIC SWITCH WITH VISIBLE SIGNAL

FIELD OF THE INVENTION

My present invention relates to a device for photoelectrically controlling a load by a change in the state of conduction of a load-operating circuit in response to luminous radiation transmitted via a fiber-optical path.

BACKGROUND OF THE INVENTION

In systems of this type it is desirable, particularly in the case of loads such as television receivers operating under high voltage, to provide full electrical separation between that operating circuit and the control member, especially when the latter is manually actuated. At the same time, the user handling the control member must have reliable ways of ascertaining whether the desired effect, i.e. opening or closure of the load-operating circuit, is being achieved. Thus, it is known to use a light shutter in combination with a semi-transparent reflector for diverting a portion of the detector-activating light beam toward a display area as a visually observable signal indicating that the shutter is open and the detector is being irradiated. Since, however, the beam usually originates at a weak source of radiation such as a light-emitting diode, its passage through a semireflector significantly attenuates the available light to be used for activation and monitoring purposes. A significant loss of light also occurs in systems of the type described in British Pat. No. 1,418,318 where the operator's finger is used to reflect luminous radiation from a source to a photodetector. The use for this purpose of a mirror carried on a displaceable switch member, without any luminous signal indicating that member's position, is suggested by German published specification No. 2,516,171.

OBJECT OF THE INVENTION

The object of my present invention, therefore, is to provide an improved device of the character referred to which satisfies the aforestated desiderata of electrical separation and signal generation with maximum utilization of the available luminous energy.

SUMMARY OF THE INVENTION

I realize this object, in accordance with my present invention, by the provision of a shutter member guided in an opaque housing for displacement between two alternate positions, in combination with fiber-optical means having a first light-receiving end confronting the source, a first light-emitting end and a second light-receiving end both terminating in the housing, and a second light-emitting end confronting the load-operating photodetector. The movable switch member carries light-reflecting means juxtaposable with the first light-emitting end and the second light-receiving end for directing incoming rays out of the housing as a visible signal in one of its alternate positions, with illumination of the photodetector being prevented, and for establishing a light path within the housing in the other alternate position to irradiate the photodetector. It will be understood that such irradiation may result in either the opening or the closure of the load-operating circuit.

The shutter member will usually be a manually displaceable pushbutton. In that instance, pursuant to a more particular feature of the invention, the switch member should have a body of light-transmissive (transparent or at least translucent) character with an exposed face which is illuminated by the incoming light rays via the reflecting means in the position in which the photodetector is cut off.

BRIEF DESCRIPTION OF THE DRAWING

The above and other features of my present invention will now be described in detail with reference to the accompanying drawing in which.

SPECIFIC DESCRIPTION

Figure 1:
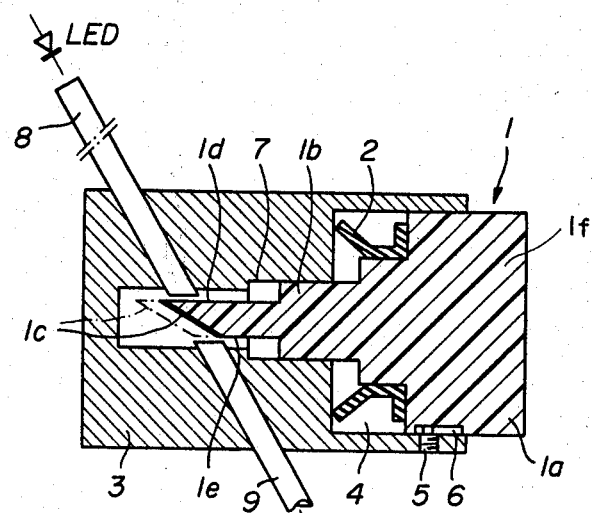
FIG. 1 is an axial sectional view of a device for the photoelectric control of a load in accordance with my invention.

In FIG. 1 I have shown a shutter member 1 of transparent material, such as glass or a synthetic resin, in the form of a pushbutton axially slidable in an opaque cylindrical housing 3 of aluminum, for example. Housing 3 has a cutout 4 accommodating the head $1a$ of pushbutton 1 which is under outward pressure from a Belleville spring 2. A stem $1b$ integral with head $1a$ is guided in a bore 7 and has a prismatic extension with parallel faces $1d$, $1e$ and with a metallized oblique end face $1c$ of internally reflecting character. Two optical fibers or fiber bundles 8, 9 extend from opposite sides into housing 3 and have ends close to faces $1d$ and $1e$ of the prismatic pushbutton extension. The distal end of incoming fiber 8 confronts a light-emitting diode LED for illumination thereby while the distal end of outgoing fiber 9 confronts a photodetector PD not shown in FIG. 1 but illustrated in FIGS. 4, 6 and 7. The axes of fibers 8 and 9 lie on a common line which intersects the reflecting face $1c$ in the unoperated position of pushbutton 1 illustrated in full lines. In its operated position, indicated in phantom lines, face $1c$ is offset from the fiber axes so that light entering the housing via fiber 8 can directly pass into fiber 9 and thus to the photodetector by way of the prismatic extension of the transparent pushbutton stem $1b$.

The stroke of pushbutton 1 is limited by a setscrew 5 entering a peripheral slot 6 in its head $1a$.

The angle of inclination of reflecting face $1c$ to the fiber axis is such that, in the full-line position, the incident light passes axially through pushbutton 1 to illuminate its exposed front face $1f$ as a signal to the user that the photodetector is not excited. Depression of the pushbutton into its alternate, phantom-line position causes this signal to disappear as the incident light passes with only slight attenuation to the photodetector.

Figure 2:
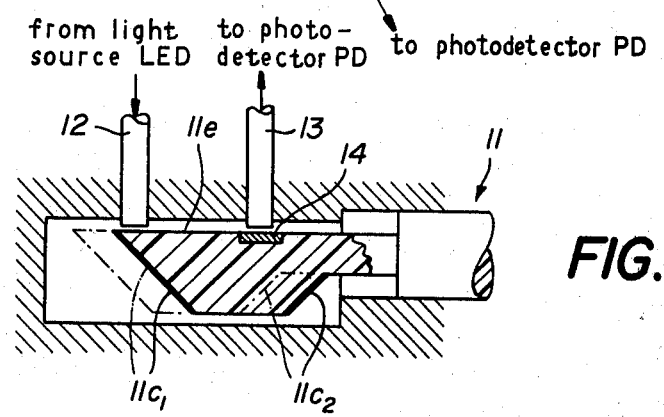
FIG. 2 is a fragmentary sectional view of a modified device generally similar to that of FIG. 1.

The device of FIG. 2 comprises a pushbutton 11 which is generally similar to the shutter member 1 of FIG. 1 but of which only the stem with its prismatic extension is visible. That extension has two metallized, internally reflecting mutually orthogonal faces $11c_1$ and $11c_2$ which are inclined at 45° to a flat face $11e$ confronting the proximal ends of an incoming fiber 12 and an outgoing fiber 13 perpendicular to that face. An opaque insert 14 on face $11e$ lies opposite the light-receiving end of outgoing fiber 13 in the illustrated full-line position of pushbutton 11 in which the rays issuing from the light-emitting end of incoming fiber 12 strike the upper half of face $11c_1$ which reflects them axially toward the nonillustrated pushbutton head, past the smaller secondary reflector $11c_2$. When, however, the pushbutton 11 is depressed into its phantom-line position, the incident rays from fiber 12 strike the lower half of face $11c_1$ and are internally reflected onto face $11c_2$ which in turn redirects them into the outgoing fiber 13, the shielding insert 14 having been moved out of the way.

Figure 3:
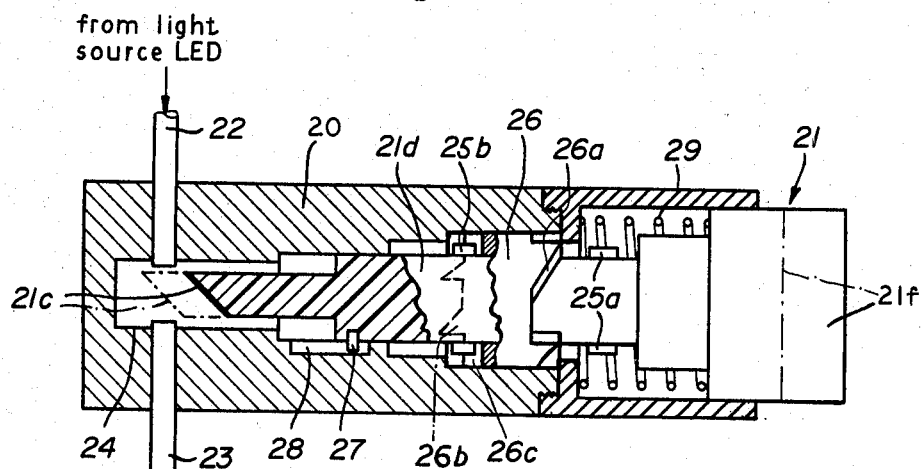
FIG. 3 is an axial sectional view similar to FIG. 1, illustrating another embodiment.

In FIG. 3 I have shown a pushbutton 21 which, in contradistinction to those of FIGS. 1 and 2, is stable in two alternate positions. Various indexing means are known in the art for this purpose. As illustrated by way of example, the cylindrical stem 21d of pushbutton 21 traverses an annularly cylindrical cam 26 which is held against axial shifting in the surrounding shutter housing 20 and is provided with two sets of ratchet teeth 26a and 26b. Stem 21d, held against rotation by a pin 27 received in a housing groove 28, carries two pairs of diametrically opposite lugs 25a and 25b respectively coacting with teeth 26a and 26b. The latter are separated by troughs which, at two diametrically opposite locations, open into axially extending slots 26c accommodating the lugs 25b to let the pushbutton 21 assume its retracted position shown in full lines into which it is urged by a coil spring 29. When the pushbutton is depressed against the spring force to the full extent of its stroke as permitted by the length of groove 28, lugs 25a come to bear upon the sloping flanks of teeth 26a to rotate the cam 26 through 45° into an intermediate angular position; upon the subsequent release of the pushbutton, its retraction by the spring 29 causes the lugs 25b to reengage the teeth 26b previously cleared by them whereby the cam 26 is rotated through another 45° in the same sense. After each depression and release, therefore, cam 26 makes a quarter turn whereby slots 26c register with lugs 25b every other time to let the pushbutton assume its full-line position in which its internally reflecting metallized face 21c is withdrawn from the light path between two coaxial fibers 22 and 23, thus allowing incident rays from incoming fiber 22 to reach the outgoing fiber 23 by way of an intervening space 24. When the lugs 25b are disaligned from slots 26c, the released pushbutton is retained in its alternate position indicated in phantom lines in which 21c intersects the fiber axis and directs the incident light rays through the transparent or translucent body of pushbutton 21 toward its exposed face 21f. In an unstable position, in which the pushbutton is fully depressed in order to change from one indexed position to the other, the light path between the two fibers may also be interrupted by an opaque insert such as shield 14 (FIG. 2) confronting one or the other fiber end. If that insert is placed on the lower face of the prismatic extension of stem 21d, i.e. close to the outgoing fiber 23, and if the material of the pushbutton body has some light-scattering properties, its head may be dimly lit in these unstable positions.

Figure 4:
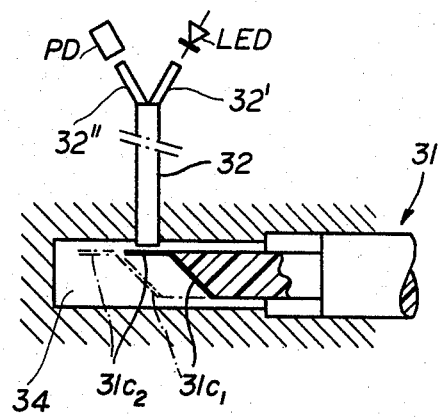
FIGS. 4, 5 and 6 are fragmentary sectional views similar to FIG. 2, showing further modifications.

If the load-operating circuit lies at considerable distance from the pushbutton-type light shutter, as where the latter serves for the remote control of a channel selector associated with a television receiver, the use of two separate fibers or fiber bundles for carrying light from its source to the shutter and thence to a photodetector may be inconvenient. In that instance, as shown in FIG. 4, a single fiber (or fiber bundle) 32 may be used and may be split into two branches 32', 32" at a Y-junction remote from the shutter. A light-receiving end of branch 32' confronts the source LED whereas a light-emitting end of branch 32" confronts the detector PD; the opposite ends of these two branches are close to each other or substantially coincide in the interior 34 of the shutter housing in which a pushbutton 31 (shown only in part) is slidably guided. The prismatic extension of the pushbutton stem again has a metallized, light-reflecting face $31c_1$, inclined at 45° to the axes of both the pushbutton and the fiber, and further carries a flat reflecting (e.g. metallic) tail $31c_2$ which is in line with the upper prism face and closely underlies the proximal fiber extremity in the illustrated full-line position of the pushbutton. In that position, therefore, the radiation of source LED is retransmitted through the fiber 32 to photodetector PD. In the alternate position of pushbutton 31, indicated in phantom lines, incident light is reflected by the prism face $31c_1$ toward the nonillustrated head as a visible signal. It will be understood that pushbutton 31 of FIG. 4 could be of the nonindexable or the indexable type as respectively shown in FIGS. 1 and 3.

Figure 5:
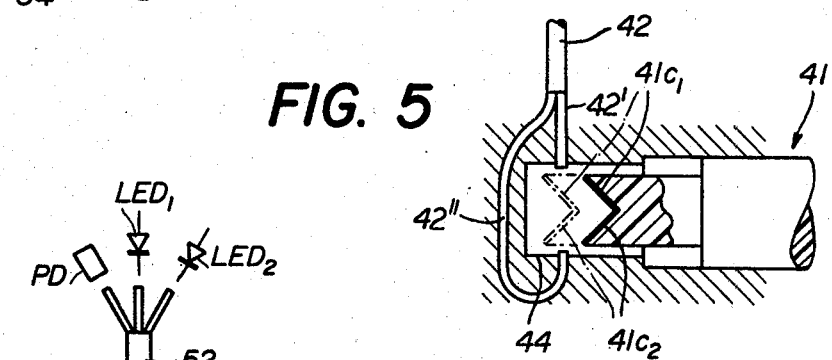

In FIG. 5 I have illustrated a fiber or fiber bundle 42 with branches 42', 42" forming a loop in the walls of the shutter housing, these branches terminating in line with each other at opposite sides of a space 44 accommodating an extension of a pushbutton 41 with two mutually orthogonal reflecting surfaces $41c_1$ and $41c_2$ which include with the fiber axis a 45° angle. In its illustrated full-line position, light from one branch passes directly via space 44 into the other branch of fiber 42 for transmission from its source to the photodetector. When the pushbutton 41 is moved into its alternate position shown in phantom lines, light rays coming either from branch 42' or from branch 42" are reflected toward the exposed face of its head as described above.

Figure 6:
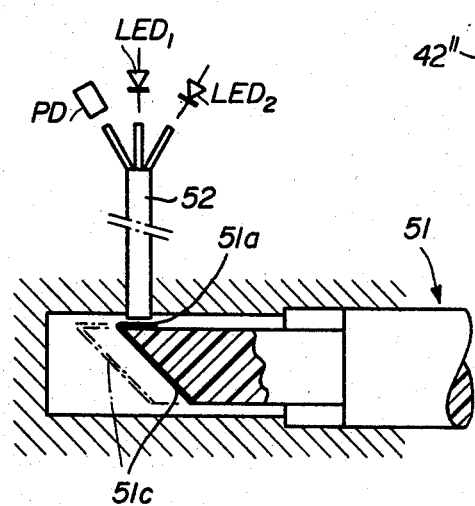

FIG. 6 shows a fiber (or fiber bundle) 52 with three branches whose distal ends respectively confront a pair of light-emitting diodes $LED_1$, $LED_2$ and a photodetector PD. Diodes $LED_1$ and $LED_2$ are assumed to emit rays of different wavelengths into the shutter housing where these rays, in the illustrated full-line position of a pushbutton 51, impinge upon a selectively reflecting mirror 51a which is substantially transparent to one of these wavelengths while retransmitting the other toward photodetector PD. The nonreflected wavelength strikes the upper part of an inclined reflecting face 51c and is redirected thereby toward the front face of the pushbutton. In the alternate position indicated in phantom lines, mirror 51a clears the path of the incident light rays so that both color components fall upon the lower half of face 51c and produce a visible signal whose shade differs from that seen in the previous position. If desired, however, the reflected wavelength may lie in an invisible (e.g. infrared) part of the spectrum so that the pushbutton face lights up only in the depressed position. With a nonselective mirror 51a the shutter of FIG. 6 would be equivalent to that of FIG. 4.

Figure 7:
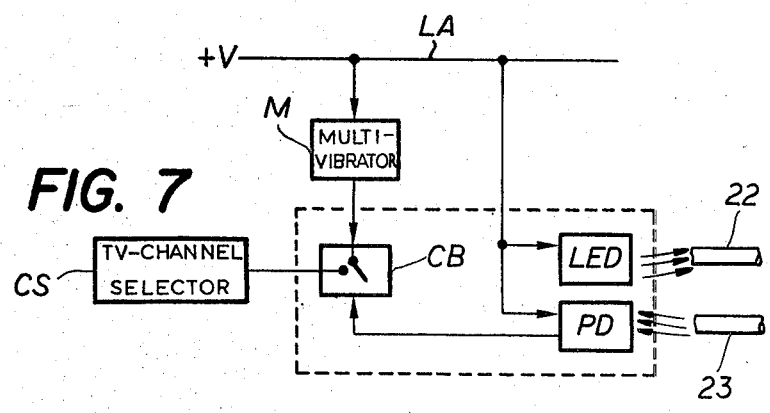
FIG. 7 is a block diagram of a load-operating circuit associated with a control device according to my invention.

In FIG. 7 I have shown an operating circuit for a load CS, particularly a television-channel selector, comprising a supply conductor LA which feeds a free-running multivibrator M constituting a pulse generator. It also feeds a light source LED and a photodetector PD respectively irradiating a fiber 22 and receiving light from a fiber 23 which correspond to those shown in FIG. 3 (although, of course, one of the other shutters described hereinabove could be used in its place). When the light path between fibers 22 and 23 is blocked by the shutter, photodetector PD has a high impedance. When photodetector PD is illuminated by diode LED via fibers 22 and 23, it closes a switch CB which connects the output of multivibrator M to load CS, thereby stepping the latter.

I claim:

1. A device for photoelectrically controlling a load, comprising:
   a source of luminous radiation;
   a photodetector responsive to said radiation for changing the state of conduction of a load-operating circuit;
   an opaque housing;
   a shutter member guided in said housing for displacement between two alternate positions;
   fiber-optical means with first and second light-receiving ends and with first and second light-emitting ends, said first light-receiving end confronting said source, said first light-emitting end and said second light-receiving end terminating in said housing, said second light-emitting end confronting said photodetector; and
   light-reflecting means on said member juxtaposable with said first light-emitting end and with said second light-receiving end for directing incoming rays from said first light-emitting end out of said housing as a visible signal while preventing illumination of said second light-receiving end in one of said alternate positions and for establishing a light path between said first light-emitting end and said second light-receiving end in the other of said alternate position to irradiate said photodetector from said source.

2. A device as defined in claim 1 wherein said member has a light-transmissive body and an exposed face, said light-reflecting means directing said rays through said body to said exposed face in said one of said alternate positions.

3. A device as defined in claim 1 or 2 wherein said light-reflecting means comprises a prismatic extension of said member with a reflecting surface intersected by an axis of said first light-emitting end at an acute angle of inclination in said one of said alternate positions.

4. A device as defined in claim 3 wherein said light path includes a portion of said reflecting surface confronting said first light-emitting end in said other of said alternate positions.

5. A device as defined in claim 4 wherein said light path further includes another reflecting surface of said extension confronting said second light-receiving end in said other of said alternate positions.

6. A device as defined in claim 3 wherein said first light-emitting end and said second light-receiving end are closely juxtaposed, said light path including another reflecting surface of said extension perpendicular to said axis confronting said juxtaposed ends in said other of said alternate positions.

7. A device as defined in claim 1 or 2 wherein said source comprises two emitters of different wavelengths, said light-reflecting means having a surface portion transparent to one of said wavelengths confronting said first light-emitting end in said other of said alternate positions for irradiating said photodetector with the other of said wavelengths while passing said one of said wavelengths out of said housing as a visible signal, both wavelengths forming said signal in said one of said alternate positions.

\* \* \* \* \*